May 23, 1933.  J. L. HALLEY  1,910,764
ARTIFICIAL DENTURE
Filed July 7, 1930

INVENTOR.
JAMES L. HALLEY
BY
ATTORNEYS.

Patented May 23, 1933

1,910,764

UNITED STATES PATENT OFFICE

JAMES L. HALLEY, OF SAN FRANCISCO, CALIFORNIA

ARTIFICIAL DENTURE

Application filed July 7, 1930. Serial No. 465,888.

This invention relates to artificial dentures and has for its object a construction of dental plates from phenol resins or condensite in its varied forms, which while preserving all the valuable characteristics of this material will avoid the brittleness of the same and overcome its tendency to crack under certain conditions, especially through the effect of sudden changes of temperature as when a wearer of the denture takes a sip of a hot drink followed by a frozen dessert.

Figure 1:
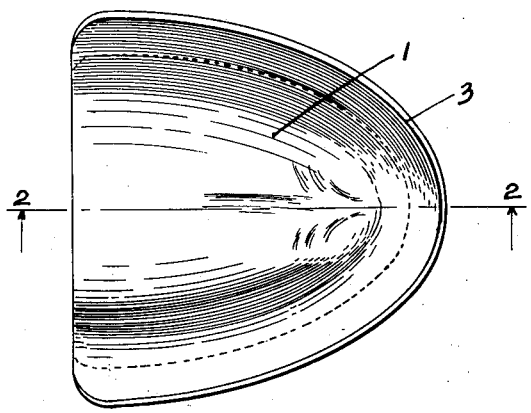
Figure 2:
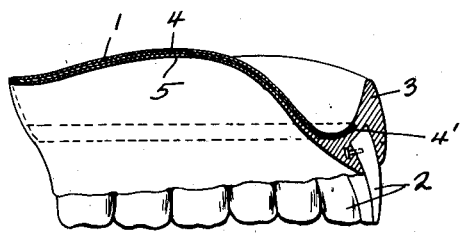
Figure 3:
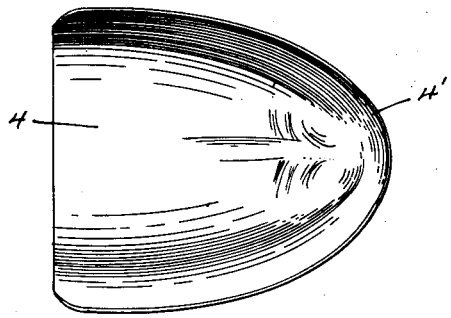

In the drawing accompanying this application, Fig. 1 is a plan view of a set of false teeth with a plate made in accordance with my invention, while Fig. 2 is a cross section of Fig. 1 as seen along the line 2—2 thereof showing the internal construction of the plate. Fig. 3 is a plan view of a vulcanized rubber plate which forms a part of the completed plate.

Phenol resin such as bakelite, as is well known, forms an excellent material for the plates of false teeth as they are practically unaffected by the various foods or secretions and hence are much preferred to other materials heretofore used but as explained they are subject to the objections above noted.

The material generally known as bakelite is obtainable in several forms, some of which may be molded under pressure and heat to complete the reaction and form a permanent molded body, but for dental use several plastic forms of this or modified material are obtainable and sold under such names as Iteco plastic, and Coedal plastic, which are adapted for spreading in the mold cavity over the vault portion of the denture and exposed necks or root portions of the artificial teeth invested in the mold and then set or "frozen" by application of heat and pressure to form the completed plate, and which is a variety of phenol resin generally known as bakelite.

In experimenting with a view to improving the quality of such bakelite plates, I have discovered that if instead of spreading the plastic resin in a layer in the mold as described, a relatively thin layer is separately placed on both complementary parts of the mold and a previously vulcanized correspondingly formed sheet of rubber is introduced between the mold faces previously covered with the cementitious resin plastic, and the mold closed and put under heat and pressure to set the bakelite, that the vulcanized rubber layer or plate within will be welded therewith into an inseparable whole having the property of almost absolute proof against cracking.

A set of false teeth made as above outlined is to outward appearances like any set of teeth with a bakelite plate, as the vulcanized rubber plate inside is entirely covered on both sides and edges with bakelite.

In Fig. 1 the bakelite palatal surface of the base or plate is indicated at 1, and the pheripheral rim in which the bases of the teeth 2 are embedded is designated 3, while in Fig. 2 the intermediate plate of vulcanized rubber is shown at 4 and the under surface or vault of the plate, also of bakelite, is designated 5.

The vulcanized rubber plate 4 will be seen to exactly follow the form of the inner and outer layers of bakelite and to terminate at its edges well within the bakelite while also extending upward over the necks of the teeth at 4'. This pre-vulcanized rubber plate is about a thirty second of one inch thick and is first made by vulcanizing from ordinary vulcanizable rubber stock in a mold made of the roof of the mouth. It is then trimmed to lie well within the margins of a mold in which the teeth are invested and foiled in the regular way as followed for bakelite plate molding. After ascertaining that the outward dimensions of the plate are all right, it is removed and a layer of plastic bakelite or phenol resin such as the dental plastic known as Coedal is applied to both sides of the mold as by warming, cutting into strips and working in well around the exposed bases of the teeth, which of course project into the mold; the vulcanized plate of rubber is then placed in position, between the layers of plastic, the mold closed and heated over a steam bath as in molding with the plastic alone to make it flow easier, and after which all excess plastic is squeezed out of the mold and the whole subjected to pressure and heat.

In the case of Coedal plastic, the curing is done by placing the mold in a suitable closed container in which a quantity of methyl alcohol is placed and heat is applied to bring the pressure up to about 100 pounds per square inch and temperature of 250° F. for about three quarters of an hour, tho in the case of other varieties of bakelite the curing may be effected by heat alone.

However, regardless of the particular grade or variation of the phenol resin used, the process is essentially the same and the result is a set of false teeth integrally united in a phenol resin plate known as condensite or bakelite inside of which is embedded a thin plate of previously vulcanized rubber substantially coextensive with the bakelite curved upwardly adjacent the necks of the teeth and with all edges set inward from and covered by the outer margins of the bakelite.

Having thus described my invention it is manifest that the precise nature or grade of the phenol resin known as, condensation product, or bakelite of whatever name, is of little consequence, and in my use of the word condensite in the claims it is intended to cover all varieties of this material.

I claim:

1. The method of making artificial dentures which comprises vulcanizing a thin sheet of rubber in a mold to the form of the roof of the mouth and trimming same to come within the margins of the denture desired, lining opposite sides of the denture plate mold with condensite material, inserting the vulcanized sheet between the layers of said material, closing the mold and heat treating the same to cure the condensite.

2. An artificial denture provided with a plate formed of condensite material embedded within which is a thin plate of vulcanized rubber pre-formed to the shape of the roof of the mouth and substantially coextensive with the plate portion of the denture with its edges kept within the margins of the denture.

3. An artificial denture provided with a plate formed of condensite material embedded within which is a thin plate of pre-vulcanized rubber pre-formed to the shape of the roof of the mouth and substantially coextensive with the plate portion of the denture with its edges kept within the margins of the denture, said plate of pre-vulcanized rubber shaped at its forward end to overlie a portion of the necks of the teeth of the denture.

JAMES L. HALLEY.